(12) United States Patent
Maier

(10) Patent No.: US 8,302,779 B2
(45) Date of Patent: Nov. 6, 2012

(54) SEPARATOR DRUM AND COMPRESSOR IMPELLER ASSEMBLY

(75) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 691 days.

(21) Appl. No.: 12/441,804

(22) PCT Filed: Sep. 21, 2007

(86) PCT No.: PCT/US2007/020471
§ 371 (c)(1),
(2), (4) Date: Oct. 16, 2009

(87) PCT Pub. No.: WO2008/036394
PCT Pub. Date: Mar. 27, 2008

(65) Prior Publication Data
US 2010/0038309 A1 Feb. 18, 2010

Related U.S. Application Data

(60) Provisional application No. 60/846,300, filed on Sep. 21, 2006.

(51) Int. Cl.
*B01D 21/26* (2006.01)
*B01D 35/00* (2006.01)

(52) U.S. Cl. ............. 210/380.3; 210/360.1; 55/438; 55/447; 96/208; 96/301; 96/305; 494/50; 494/51

(58) Field of Classification Search ......... 210/360.1, 210/380.3; 55/438, 447; 96/208, 301, 305; 494/50, 51
See application file for complete search history.

(56) References Cited

U.S. PATENT DOCUMENTS 815,812 A 3/1906 Gow
1,057,613 A 4/1913 Baldwin
(Continued)

FOREIGN PATENT DOCUMENTS

CA 2647511 10/2007
(Continued)

OTHER PUBLICATIONS

Extended European Search Report issued in Application No. EP 07838631, Nov. 17, 2009, 6 pgs., European Patent Office, Munich, Germany.

(Continued)

*Primary Examiner* — David A Reifsnyder
(74) *Attorney, Agent, or Firm* — Edmonds & Nolte, PC

(57) ABSTRACT

A fluid handling assembly is for a fluid machine that includes a casing and a shaft disposed within the casing so as to be rotatable about a central axis. An impeller is mounted on the shaft and has an inlet and a rotary separator is mounted on the shaft and has axially spaced apart inlet and outlet ends and an interior separation chamber. The separator is coupled with the impeller such that the separator and the impeller generally rotate as a single unit about the shaft axis and fluid within the separation chamber flows from the separator outlet end directly into the impeller inlet. Preferably, the separator includes a plurality of generally radially-extending blades disposed proximal to the separator inlet end and spaced circumferentially about the axis, the plurality of blades being configured to accelerate fluid flowing into the separator inlet end during rotation of the separator.

20 Claims, 3 Drawing Sheets

U.S. PATENT DOCUMENTS

| | | |
|---|---|---|
| 1,061,656 A | 5/1913 | Black |
| 1,480,775 A | 1/1924 | Marien |
| 1,622,768 A | 3/1927 | Cook et al. |
| 1,642,454 A | 9/1927 | Malmstrom |
| 2,006,244 A | 6/1935 | Kopsa |
| 2,300,766 A | 11/1942 | Baumann |
| 2,328,031 A | 8/1943 | Risley |
| 2,345,437 A | 3/1944 | Tinker |
| 2,602,462 A | 7/1952 | Barrett |
| 2,811,303 A | 10/1957 | Ault et al. |
| 2,836,117 A | 5/1958 | Lankford |
| 2,868,565 A | 1/1959 | Suderow |
| 2,897,917 A | 8/1959 | Hunter |
| 2,932,360 A | 4/1960 | Hungate |
| 2,954,841 A | 10/1960 | Reistle |
| 3,044,657 A | 7/1962 | Horton |
| 3,191,364 A | 6/1965 | Sylvan |
| 3,198,214 A | 8/1965 | Lorenz |
| 3,204,696 A | 9/1965 | De Priester et al. |
| 3,213,794 A | 10/1965 | Adams |
| 3,220,245 A | 11/1965 | Van Winkle |
| 3,273,325 A | 9/1966 | Gerhold |
| 3,352,577 A | 11/1967 | Medney |
| 3,395,511 A | 8/1968 | Akerman |
| 3,420,434 A | 1/1969 | Swearingen |
| 3,431,747 A | 3/1969 | Hasheimi et al. |
| 3,454,163 A | 7/1969 | Read |
| 3,487,432 A | 12/1969 | Jenson |
| 3,490,209 A | 1/1970 | Fernandes et al. |
| 3,500,614 A | 3/1970 | Soo |
| 3,578,342 A | 5/1971 | Satterthwaite et al. |
| 3,628,812 A | 12/1971 | Larraide et al. |
| 3,672,733 A | 6/1972 | Arsenius et al. |
| 3,814,486 A | 6/1974 | Schurger |
| 3,829,179 A | 8/1974 | Kurita et al. |
| 3,915,673 A | 10/1975 | Tamai et al. |
| 3,975,123 A | 8/1976 | Schibbye |
| 4,033,647 A | 7/1977 | Beavers |
| 4,059,364 A | 11/1977 | Andersen et al. |
| 4,078,809 A | 3/1978 | Garrick et al. |
| 4,087,261 A | 5/1978 | Hays |
| 4,103,899 A | 8/1978 | Turner |
| 4,112,687 A | 9/1978 | Dixon |
| 4,117,359 A | 9/1978 | Wehde |
| 4,135,542 A | 1/1979 | Chisholm |
| 4,141,283 A | 2/1979 | Swanson et al. |
| 4,146,261 A | 3/1979 | Edmaier et al. |
| 4,165,622 A | 8/1979 | Brown, Jr. |
| 4,174,925 A | 11/1979 | Pfenning et al. |
| 4,182,480 A | 1/1980 | Theyse et al. |
| 4,197,990 A | 4/1980 | Carberg et al. |
| 4,205,927 A | 6/1980 | Simmons |
| 4,227,373 A | 10/1980 | Amend et al. |
| 4,258,551 A | 3/1981 | Ritzi |
| 4,259,045 A | 3/1981 | Teruyama |
| 4,278,200 A | 7/1981 | Gunnewig |
| 4,298,311 A | 11/1981 | Ritzi |
| 4,333,748 A | 6/1982 | Erickson |
| 4,334,592 A | 6/1982 | Fair |
| 4,336,693 A | 6/1982 | Hays et al. |
| 4,339,923 A | 7/1982 | Hays et al. |
| 4,347,900 A | 9/1982 | Barrington |
| 4,363,608 A | 12/1982 | Mulders |
| 4,374,583 A | 2/1983 | Barrington |
| 4,375,975 A | 3/1983 | McNicholas |
| 4,382,804 A | 5/1983 | Mellor |
| 4,384,724 A | 5/1983 | Derman et al. |
| 4,391,102 A | 7/1983 | Studhalter et al. |
| 4,396,361 A | 8/1983 | Fraser |
| 4,432,470 A | 2/1984 | Sopha |
| 4,438,638 A | 3/1984 | Hays et al. |
| 4,441,322 A | 4/1984 | Ritzi |
| 4,442,925 A | 4/1984 | Fukushima et al. |
| 4,453,893 A | 6/1984 | Hutmaker |
| 4,463,567 A | 8/1984 | Amend et al. |
| 4,468,234 A | 8/1984 | McNicholas |
| 4,471,795 A | 9/1984 | Linhardt |
| 4,477,223 A | 10/1984 | Giroux |
| 4,502,839 A | 3/1985 | Maddox et al. |
| 4,511,309 A | 4/1985 | Maddox |
| 4,531,888 A | 7/1985 | Buchelt |
| 4,536,134 A | 8/1985 | Huiber |
| 4,541,531 A | 9/1985 | Brule |
| 4,541,607 A | 9/1985 | Hotger |
| 4,573,527 A | 3/1986 | McDonough |
| 4,574,815 A | 3/1986 | West et al. |
| 4,648,806 A | 3/1987 | Alexander |
| 4,687,017 A | 8/1987 | Danko et al. |
| 4,737,081 A | 4/1988 | Nakajima et al. |
| 4,752,185 A | 6/1988 | Butler et al. |
| 4,807,664 A | 2/1989 | Wilson et al. |
| 4,813,495 A | 3/1989 | Leach |
| 4,821,737 A | 4/1989 | Nelson |
| 4,826,403 A | 5/1989 | Catlow |
| 4,830,331 A | 5/1989 | Vindum |
| 4,832,709 A | 5/1989 | Nagyszalanczy |
| 4,904,284 A | 2/1990 | Hanabusa |
| 4,984,830 A | 1/1991 | Saunders |
| 5,007,328 A | 4/1991 | Otterman |
| 5,024,585 A | 6/1991 | Kralovec |
| 5,043,617 A | 8/1991 | Rostron |
| 5,044,701 A | 9/1991 | Watanabe et al. |
| 5,045,046 A | 9/1991 | Bond |
| 5,054,995 A | 10/1991 | Kaseley et al. |
| 5,064,452 A | 11/1991 | Yano et al. |
| 5,080,137 A | 1/1992 | Adams |
| 5,190,440 A | 3/1993 | Maier et al. |
| 5,202,024 A | 4/1993 | Andersson et al. |
| 5,202,026 A | 4/1993 | Lema |
| 5,203,891 A | 4/1993 | Lema |
| 5,207,810 A | 5/1993 | Sheth |
| 5,211,427 A | 5/1993 | Washizu |
| 5,246,346 A | 9/1993 | Schiesser |
| 5,285,123 A | 2/1994 | Kataoka et al. |
| 5,306,051 A | 4/1994 | Loker et al. |
| 5,337,779 A | 8/1994 | Fukuhara |
| 5,378,121 A | 1/1995 | Hackett |
| 5,385,446 A | 1/1995 | Hays |
| 5,421,708 A | 6/1995 | Utter |
| 5,443,581 A | 8/1995 | Malone |
| 5,484,521 A | 1/1996 | Kramer |
| 5,496,394 A | 3/1996 | Nied |
| 5,500,039 A | 3/1996 | Mori et al. |
| 5,525,034 A | 6/1996 | Hays |
| 5,525,146 A | 6/1996 | Straub |
| 5,531,811 A | 7/1996 | Kloberdanz |
| 5,538,259 A | 7/1996 | Uhrner et al. |
| 5,542,831 A | 8/1996 | Scarfone |
| 5,575,309 A | 11/1996 | Connell |
| 5,585,000 A | 12/1996 | Sassi |
| 5,605,172 A | 2/1997 | Schubert et al. |
| 5,628,623 A | 5/1997 | Skaggs |
| 5,634,492 A | 6/1997 | Steinruck et al. |
| 5,640,472 A | 6/1997 | Meinzer et al. |
| 5,641,280 A | 6/1997 | Timuska |
| 5,653,347 A | 8/1997 | Larsson |
| 5,664,420 A | 9/1997 | Hays |
| 5,682,759 A | 11/1997 | Hays |
| 5,683,235 A | 11/1997 | Welch |
| 5,685,691 A | 11/1997 | Hays |
| 5,687,249 A | 11/1997 | Kato |
| 5,693,125 A | 12/1997 | Dean |
| 5,703,424 A | 12/1997 | Dorman |
| 5,709,528 A | 1/1998 | Hablanian |
| 5,713,720 A | 2/1998 | Barhoum |
| 5,720,799 A | 2/1998 | Hays |
| 5,750,040 A | 5/1998 | Hays |
| 5,775,882 A | 7/1998 | Kiyokawa et al. |
| 5,779,619 A | 7/1998 | Borgstrom et al. |
| 5,795,135 A | 8/1998 | Nyilas et al. |
| 5,800,092 A | 9/1998 | Nill et al. |
| 5,848,616 A | 12/1998 | Vogel et al. |
| 5,850,857 A | 12/1998 | Simpson |
| 5,853,585 A | 12/1998 | Nesseth |
| 5,863,023 A | 1/1999 | Evans et al. |
| 5,899,435 A | 5/1999 | Mitsch et al. |
| 5,935,053 A | 8/1999 | Strid |

| | | |
|---|---|---|
| 5,938,803 A | 8/1999 | Dries |
| 5,938,819 A | 8/1999 | Seery |
| 5,946,915 A | 9/1999 | Hays |
| 5,951,066 A | 9/1999 | Lane et al. |
| 5,965,022 A | 10/1999 | Gould |
| 5,967,746 A | 10/1999 | Hagi et al. |
| 5,971,702 A | 10/1999 | Afton et al. |
| 5,971,907 A | 10/1999 | Johannemann et al. |
| 5,980,218 A | 11/1999 | Takahashi et al. |
| 5,988,524 A | 11/1999 | Odajima et al. |
| 6,035,934 A | 3/2000 | Stevenson et al. |
| 6,059,539 A | 5/2000 | Nyilas et al. |
| 6,068,447 A | 5/2000 | Foege |
| 6,090,174 A | 7/2000 | Douma et al. |
| 6,090,299 A | 7/2000 | Hays et al. |
| 6,113,675 A | 9/2000 | Branstetter |
| 6,122,915 A | 9/2000 | Hays |
| 6,123,363 A | 9/2000 | Burgard et al. |
| 6,145,844 A | 11/2000 | Waggott |
| 6,149,825 A | 11/2000 | Gargas |
| 6,151,881 A | 11/2000 | Ai et al. |
| 6,196,962 B1 | 3/2001 | Purvey et al. |
| 6,206,202 B1 | 3/2001 | Galk et al. |
| 6,214,075 B1 | 4/2001 | Filges et al. |
| 6,217,637 B1 | 4/2001 | Toney et al. |
| 6,227,379 B1 | 5/2001 | Nesseth |
| 6,277,278 B1 | 8/2001 | Conrad et al. |
| 6,312,021 B1 | 11/2001 | Thomas |
| 6,314,738 B1 | 11/2001 | Hays |
| 6,372,006 B1 | 4/2002 | Pregenzer et al. |
| 6,375,437 B1 | 4/2002 | Nolan |
| 6,383,262 B1 | 5/2002 | Marthinsen et al. |
| 6,394,764 B1 | 5/2002 | Samurin |
| 6,398,973 B1 | 6/2002 | Saunders et al. |
| 6,402,465 B1 | 6/2002 | Maier |
| 6,426,010 B1 | 7/2002 | Lecoffre et al. |
| 6,464,469 B1 | 10/2002 | Grob et al. |
| 6,467,988 B1 | 10/2002 | Czachor et al. |
| 6,468,426 B1 | 10/2002 | Klass |
| 6,485,536 B1 | 11/2002 | Masters |
| 6,530,484 B1 | 3/2003 | Bosman |
| 6,530,979 B2 | 3/2003 | Firey |
| 6,531,066 B1 | 3/2003 | Saunders et al. |
| 6,537,035 B2 | 3/2003 | Shumway |
| 6,540,917 B1 | 4/2003 | Rachels et al. |
| 6,547,037 B2 | 4/2003 | Kuzdzal |
| 6,592,654 B2 | 7/2003 | Brown |
| 6,596,046 B2 | 7/2003 | Conrad et al. |
| 6,599,086 B2 | 7/2003 | Soja |
| 6,607,348 B2 | 8/2003 | Jean |
| 6,616,719 B1 | 9/2003 | Sun et al. |
| 6,617,731 B1 | 9/2003 | Goodnick |
| 6,629,825 B2 | 10/2003 | Stickland et al. |
| 6,631,617 B1 | 10/2003 | Dreiman et al. |
| 6,658,986 B2 | 12/2003 | Pitla et al. |
| 6,659,143 B1 | 12/2003 | Taylor et al. |
| 6,669,845 B2 | 12/2003 | Klass |
| 6,688,802 B2 | 2/2004 | Ross et al. |
| 6,707,200 B2 | 3/2004 | Carroll et al. |
| 6,718,955 B1 | 4/2004 | Knight |
| 6,719,830 B2 | 4/2004 | Illingworth et al. |
| 6,764,284 B2 | 7/2004 | Oehman, Jr. |
| 6,776,812 B2 | 8/2004 | Komura et al. |
| 6,802,693 B2 | 10/2004 | Reinfeld et al. |
| 6,802,881 B2 | 10/2004 | Illingworth et al. |
| 6,811,713 B2 | 11/2004 | Arnaud |
| 6,817,846 B2 | 11/2004 | Bennitt |
| 6,837,913 B2 | 1/2005 | Schilling et al. |
| 6,843,836 B2 | 1/2005 | Kitchener |
| 6,878,187 B1 | 4/2005 | Hays et al. |
| 6,893,208 B2 | 5/2005 | Frosini et al. |
| 6,907,933 B2 | 6/2005 | Choi et al. |
| 6,979,358 B2 | 12/2005 | Ekker |
| 7,001,448 B1 | 2/2006 | West |
| 7,013,978 B2 | 3/2006 | Appleford et al. |
| 7,022,150 B2 | 4/2006 | Borgstrom et al. |
| 7,022,153 B2 | 4/2006 | McKenzie |
| 7,025,890 B2 | 4/2006 | Moya |
| 7,033,410 B2 | 4/2006 | Hilpert et al. |
| 7,033,411 B2 | 4/2006 | Carlsson et al. |
| 7,056,363 B2 | 6/2006 | Carlsson et al. |
| 7,063,465 B1 | 6/2006 | Wilkes et al. |
| 7,112,036 B2 | 9/2006 | Lubell et al. |
| 7,131,292 B2 | 11/2006 | Ikegami et al. |
| 7,144,226 B2 | 12/2006 | Pugnet et al. |
| 7,159,723 B2 | 1/2007 | Hilpert et al. |
| 7,160,518 B2 | 1/2007 | Chen et al. |
| 7,169,305 B2 | 1/2007 | Gomez |
| 7,185,447 B2 | 3/2007 | Arbeiter |
| 7,204,241 B2 | 4/2007 | Thompson |
| 7,241,392 B2 | 7/2007 | Maier |
| 7,244,111 B2 | 7/2007 | Suter et al. |
| 7,258,713 B2 | 8/2007 | Eubank et al. |
| 7,270,145 B2 | 9/2007 | Koezler |
| 7,288,202 B2 | 10/2007 | Maier |
| 7,314,560 B2 | 1/2008 | Yoshida et al. |
| 7,323,023 B2 | 1/2008 | Michele et al. |
| 7,328,749 B2 | 2/2008 | Reitz |
| 7,335,313 B2 | 2/2008 | Moya |
| 7,377,110 B2 | 5/2008 | Sheridan et al. |
| 7,381,235 B2 | 6/2008 | Koene et al. |
| 7,396,373 B2 | 7/2008 | Lagerstedt et al. |
| 7,399,412 B2 | 7/2008 | Keuschnigg |
| 7,435,290 B2 | 10/2008 | Lane et al. |
| 7,445,653 B2 | 11/2008 | Trautmann et al. |
| 7,470,299 B2 | 12/2008 | Han et al. |
| 7,473,083 B2 | 1/2009 | Oh et al. |
| 7,479,171 B2 | 1/2009 | Cho et al. |
| 7,494,523 B2 | 2/2009 | Oh et al. |
| 7,501,002 B2 | 3/2009 | Han et al. |
| 7,520,210 B2 | 4/2009 | Theodore, Jr. et al. |
| 7,575,422 B2 | 8/2009 | Bode et al. |
| 7,578,863 B2 | 8/2009 | Becker et al. |
| 7,591,882 B2 | 9/2009 | Harazim |
| 7,594,941 B2 | 9/2009 | Zheng et al. |
| 7,594,942 B2 | 9/2009 | Polderman |
| 7,610,955 B2 | 11/2009 | Irwin, Jr. |
| 7,628,836 B2 | 12/2009 | Baronet et al. |
| 7,637,699 B2 | 12/2009 | Albrecht |
| 7,674,377 B2 | 3/2010 | Crew |
| 7,677,308 B2 | 3/2010 | Kolle |
| 7,708,537 B2 | 5/2010 | Bhatia et al. |
| 7,708,808 B2 | 5/2010 | Heumann |
| 7,744,663 B2 | 6/2010 | Wallace |
| 7,748,079 B2 | 7/2010 | McDowell et al. |
| 7,766,989 B2 | 8/2010 | Lane et al. |
| 7,811,344 B1 | 10/2010 | Duke et al. |
| 7,811,347 B2 | 10/2010 | Carlsson et al. |
| 7,815,415 B2 | 10/2010 | Kanezawa et al. |
| 7,824,458 B2 | 11/2010 | Borgstrom et al. |
| 7,824,459 B2 | 11/2010 | Borgstrom et al. |
| 7,846,228 B1 | 12/2010 | Saaski et al. |
| 2001/0007283 A1 | 7/2001 | Johal et al. |
| 2002/0009361 A1 | 1/2002 | Reichert et al. |
| 2003/0029318 A1 | 2/2003 | Firey |
| 2003/0035718 A1 | 2/2003 | Langston et al. |
| 2003/0136094 A1 | 7/2003 | Illingworth et al. |
| 2004/0007261 A1 | 1/2004 | Cornwell |
| 2004/0170505 A1 | 9/2004 | Lenderink et al. |
| 2005/0173337 A1 | 8/2005 | Costinel |
| 2006/0065609 A1 | 3/2006 | Arthur |
| 2006/0090430 A1 | 5/2006 | Trautman et al. |
| 2006/0096933 A1 | 5/2006 | Maier |
| 2006/0157251 A1 | 7/2006 | Stinessen et al. |
| 2006/0157406 A1 | 7/2006 | Maier |
| 2006/0193728 A1 | 8/2006 | Lindsey et al. |
| 2006/0222515 A1 | 10/2006 | Delmotte et al. |
| 2006/0230933 A1 | 10/2006 | Harazim |
| 2006/0239831 A1 | 10/2006 | Garris, Jr. |
| 2006/0254659 A1 | 11/2006 | Ballott et al. |
| 2006/0275160 A1 | 12/2006 | Leu et al. |
| 2007/0029091 A1 | 2/2007 | Stinessen et al. |
| 2007/0036646 A1 | 2/2007 | Nguyen et al. |
| 2007/0051245 A1 | 3/2007 | Yun |
| 2007/0062374 A1 | 3/2007 | Kolle |
| 2007/0065317 A1 | 3/2007 | Stock |
| 2007/0084340 A1 | 4/2007 | Dou et al. |
| 2007/0140870 A1 | 6/2007 | Fukanuma et al. |

| | | | |
|---|---|---|---|
| 2007/0151922 | A1 | 7/2007 | Mian |
| 2007/0163215 | A1 | 7/2007 | Lagerstadt |
| 2007/0172363 | A1 | 7/2007 | Laboube et al. |
| 2007/0196215 | A1 | 8/2007 | Frosini et al. |
| 2007/0227969 | A1 | 10/2007 | Dehaene et al. |
| 2007/0294986 | A1 | 12/2007 | Beetz |
| 2008/0031732 | A1 | 2/2008 | Peer et al. |
| 2008/0039732 | A9 | 2/2008 | Bowman |
| 2008/0246281 | A1 | 10/2008 | Agrawal et al. |
| 2008/0315812 | A1 | 12/2008 | Balboul |
| 2009/0013658 | A1 | 1/2009 | Borgstrom et al. |
| 2009/0015012 | A1 | 1/2009 | Metzler et al. |
| 2009/0025562 | A1 | 1/2009 | Hallgren et al. |
| 2009/0025563 | A1 | 1/2009 | Borgstrom et al. |
| 2009/0151928 | A1 | 6/2009 | Lawson |
| 2009/0159523 | A1 | 6/2009 | McCutchen |
| 2009/0169407 | A1 | 7/2009 | Yun |
| 2009/0173095 | A1 | 7/2009 | Bhatia et al. |
| 2009/0266231 | A1 | 10/2009 | Franzen et al. |
| 2009/0304496 | A1 | 12/2009 | Maier |
| 2009/0321343 | A1 | 12/2009 | Maier |
| 2009/0324391 | A1 | 12/2009 | Maier |
| 2010/0007133 | A1 | 1/2010 | Maier |
| 2010/0021292 | A1 | 1/2010 | Maier et al. |
| 2010/0038309 | A1 | 2/2010 | Maier |
| 2010/0043288 | A1 | 2/2010 | Wallace |
| 2010/0043364 | A1 | 2/2010 | Curien |
| 2010/0044966 | A1 | 2/2010 | Majot et al. |
| 2010/0072121 | A1 | 3/2010 | Maier |
| 2010/0074768 | A1 | 3/2010 | Maier |
| 2010/0083690 | A1 | 4/2010 | Sato et al. |
| 2010/0090087 | A1 | 4/2010 | Maier |
| 2010/0143172 | A1 | 6/2010 | Sato et al. |
| 2010/0163232 | A1 | 7/2010 | Kolle |
| 2010/0183438 | A1 | 7/2010 | Maier et al. |
| 2010/0239419 | A1 | 9/2010 | Maier et al. |
| 2010/0239437 | A1 | 9/2010 | Maier |
| 2010/0247299 | A1 | 9/2010 | Maier |
| 2010/0257827 | A1 | 10/2010 | Lane et al. |
| 2011/0017307 | A1 | 1/2011 | Kidd et al. |
| 2011/0061536 | A1 | 3/2011 | Maier et al. |

FOREIGN PATENT DOCUMENTS

| | | |
|---|---|---|
| EP | 301285 | 10/1991 |
| EP | 1582703 A2 | 10/2005 |
| EP | 2013479 | 1/2009 |
| EP | 7838631.5 | 12/2009 |
| GB | 2323639 | 9/1998 |
| GB | 2337561 | 11/1999 |
| JP | 54099206 | 1/1978 |
| JP | 08-068501 | 3/1996 |
| JP | 8-284961 A | 11/1996 |
| JP | 2002 242699 | 8/2002 |
| JP | 2004034017 A | 2/2004 |
| JP | 3711028 | 10/2005 |
| JP | 2005291202 | 10/2005 |
| KR | 2009085521 | 2/2008 |
| MX | 2008012579 | 12/2008 |
| WO | 9524563 | 9/1995 |
| WO | 0117096 | 3/2001 |
| WO | 2007043889 | 4/2007 |
| WO | 2007103248 | 9/2007 |
| WO | 2007120506 | 10/2007 |
| WO | 2008036221 | 3/2008 |
| WO | 2008039446 | 3/2008 |
| WO | WO 2008036394 A2 * | 3/2008 |
| WO | 2008039491 | 4/2008 |
| WO | 2008039731 | 4/2008 |
| WO | 2008039732 | 4/2008 |
| WO | 2008039733 | 4/2008 |
| WO | 2008039734 | 4/2008 |
| WO | 2008036394 | 7/2008 |
| WO | 2009111616 | 9/2009 |
| WO | 2009158252 | 12/2009 |
| WO | 2009158253 | 12/2009 |
| WO | 2010083416 | 7/2010 |
| WO | 2010083427 | 7/2010 |
| WO | 2010107579 | 9/2010 |
| WO | 2010110992 | 9/2010 |
| WO | 2011034764 | 3/2011 |

OTHER PUBLICATIONS

Technical Manual—High Pressure Air Compressor Model 13NL45; Navsea S6220-AT-MMA-010/93236, pp. 3-23 to 3-32, Electric Boat Corporation, Groton, CT 06340, Oct. 28, 1991.
PCT/US2007/008149 International Preliminary Report on Patentability dated Sep. 30, 2008.
PCT/US2007/008149 International Search Report and Written Opinion dated Jul. 17, 2008.
PCT/US2007/020101 International Preliminary Report on Patentability dated Apr. 2, 2009.
PCT/US2007/020101 International Search Report dated Apr. 29, 2008.
PCT/US2007/020101 Written Opinion dated Mar. 19, 2009.
PCT/US2007/020471 International Preliminary Report on Patentability dated Apr. 2, 2009.
PCT/US2007/020471 International Search Report and Written Opinion dated Apr. 1, 2008.
PCT/US2007/020659 International Preliminary Report on Patentability dated Mar. 31, 2009.
PCT/US2007/020659 International Search Report and Written Opinion dated Sep. 17, 2008.
PCT/US2007/020768 International Preliminary Report on Patentability dated Mar. 31, 2009.
PCT/US2007/020768 International Search Report and Written Opinion dated Mar. 3, 2008.
PCT/US2007/079348 International Preliminary Report on Patentability dated Mar. 31, 2009.
PCT/US2007/079348 International Search Report dated Apr. 11, 2008.
PCT/US2007/079348 Written Opinion dated Jan. 25, 2008.
PCT/US2007/079349 International Preliminary Report on Patentability dated Mar. 31, 2009.
PCT/US2007/079349 International Search Report and Written Opinion dated Apr. 2, 2008.
PCT/US2007/079350 International Preliminary Report on Patentability dated Mar. 31, 2009.
PCT/US2007/079350 International Search Report dated Jul. 17, 2008.
PCT/US2007/079350 Written Opinion dated Mar. 25, 2009.
PCT/US2007/079352 International Preliminary Report on Patentability dated Mar. 31, 2009.
PCT/US2007/079352 International Search Report and Written Opinion dated Aug. 27, 2008.
PCT/US2009/036142 International Preliminary Report on Patentability dated Sep. 16, 2010.
PCT/US2009/036142 International Search Report dated Jan. 7, 2010.
PCT/US2009/036142 Written Opinion dated May 11, 2009.
PCT/US2009/047662 International Preliminary Report on Patentability dated Jan. 13, 2011.
PCT/US2009/047662 Written Opinion dated Aug. 20, 2009.
PCT/US2010/021199 International Search Report and Written Opinion dated Mar. 22, 2010.
PCT/US2010/021199 International Preliminary Report on Patentability dated Mar. 29, 2011.
PCT/US2010/021218 International Search Report and Written Opinion dated Mar. 23, 2010.
PCT/US2010/021218 International Report on Patentability dated Feb. 2, 2011.
PCT/US2010/025650 International Search Report and Written Opinion dated Apr. 22, 2010.
PCT/US2010/025650 International Report on Patentability dated Mar. 14, 2011.
PCT/US2010/025952 International Search Report and Written Opinion dated Apr. 12, 2010.

PCT/US2010/025952 International Report on Patentability dated Mar. 14, 2011.
PCT/US2009/047667 International Report on Patentability dated Jan. 13, 2011.
PCT/US2009/047667 Written Opinion dated Aug. 7, 2009.

PCT/US2009/047667 International Search Report dated Dec. 30, 2009.
Dresser-Rand, Inc. "High Pressure Air Compressor Model 13NL45," Oct. 28, 1991, 14 pages.

* cited by examiner

SEPARATOR DRUM AND COMPRESSOR IMPELLER ASSEMBLY

CROSS REFERENCE

This application is a United States national phase application of co-pending international patent application number PCT/US2007/020471, filed Sep. 21, 2007, which claims priority to U.S. Provisional Patent Application No. 60/846,300, filed Sep. 21, 2006, the disclosures of which are incorporated herein by reference.

The present invention relates to fluid machinery, and more particularly to combination separator and compressor devices.

Centrifugal compressors are known and typically include one or more impellers mounted on a driven shaft and configured to pressurize gas drawn into a central inlet and to discharge the fluid radially outwardly through one or more outlets located at an outer circumferential perimeter thereof. In order to properly function, only gas should be directed into the compressor inlet, such that any liquids should be removed from a fluid stream prior to entry into the compressor. As such, compressors are often used in conjunction with a separator device to remove liquids from the fluid stream prior to entry into the compressor inlet.

One type of separator is a rotary separator that uses centrifugal force to separate out heavier liquids from the gases in a fluid stream and generally includes a rotating drum with an interior flow chamber. Such separators typically utilize static swirl vanes to increase or induce circumferential motion of the fluid stream prior to entry into the drum inner chamber, so as to increase the likelihood of the liquid coming into contact with the inner surface of the drum. However, to increase the effectiveness of the compressor operations, such prior art rotary separators are typically used in combination with a "de-swirl" device which increases the pressure of the gaseous stream and "straightens" or redirects the flow to a more axial direction. That is, the flow exiting the separator drum generally flows through a plurality of static de-swirl vanes and then into the impeller inlet. Although this manner of operating a compressor has been relatively effective, the processes of swirling and then "de-swirling" the fluid flow are believed to cause unrecovered energy losses in a gaseous stream passing through the compressor.

SUMMARY OF THE INVENTION

In one aspect, the present invention is a fluid handling assembly for a fluid machine, the machine including a casing and a shaft disposed within the casing so as to be rotatable about a central axis. The fluid handling assembly comprises an impeller mounted on the shaft and having an inlet and a rotary separator mounted on the shaft. The separator has axially spaced apart inlet and outlet ends and an interior separation chamber. The separator is coupled with the impeller such that fluid within the separation chamber flows from the separator outlet end directly into the impeller inlet.

In another aspect, the present invention is a compressor comprising a casing, a shaft disposed within the casing and rotatable about a central axis, an impeller mounted on the shaft and having a central inlet, and a rotary separator mounted on the shaft. The separator has axially spaced apart inlet and outlet ends and an interior separation chamber. The separator is coupled with the impeller such that fluid within the separation chamber flows through the separator outlet end directly into the impeller inlet.

In a further aspect, the present invention is a fluid handling assembly for a fluid machine including a casing and a shaft disposed within the casing so as to be rotatable about a central axis. The fluid handling assembly comprises an impeller mounted on the shaft and having an inlet and an outlet, the impeller being configured to compress fluid flowing into the inlet and to discharge compressed fluid through the outlet. A rotary separator is mounted on the shaft and has axially spaced apart inlet and outlet ends and an interior separation chamber extending generally between the inlet and outlet ends. The separator is coupled with the impeller such that the separator and impeller rotate as a single unit about the shaft axis and the separation chamber is fluidly connected with the impeller inlet. Further, the separator is configured to remove at least a portion of liquid from fluid passing through the separation chamber from the inlet end and to discharge the fluid through the outlet end and directly into the impeller inlet.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
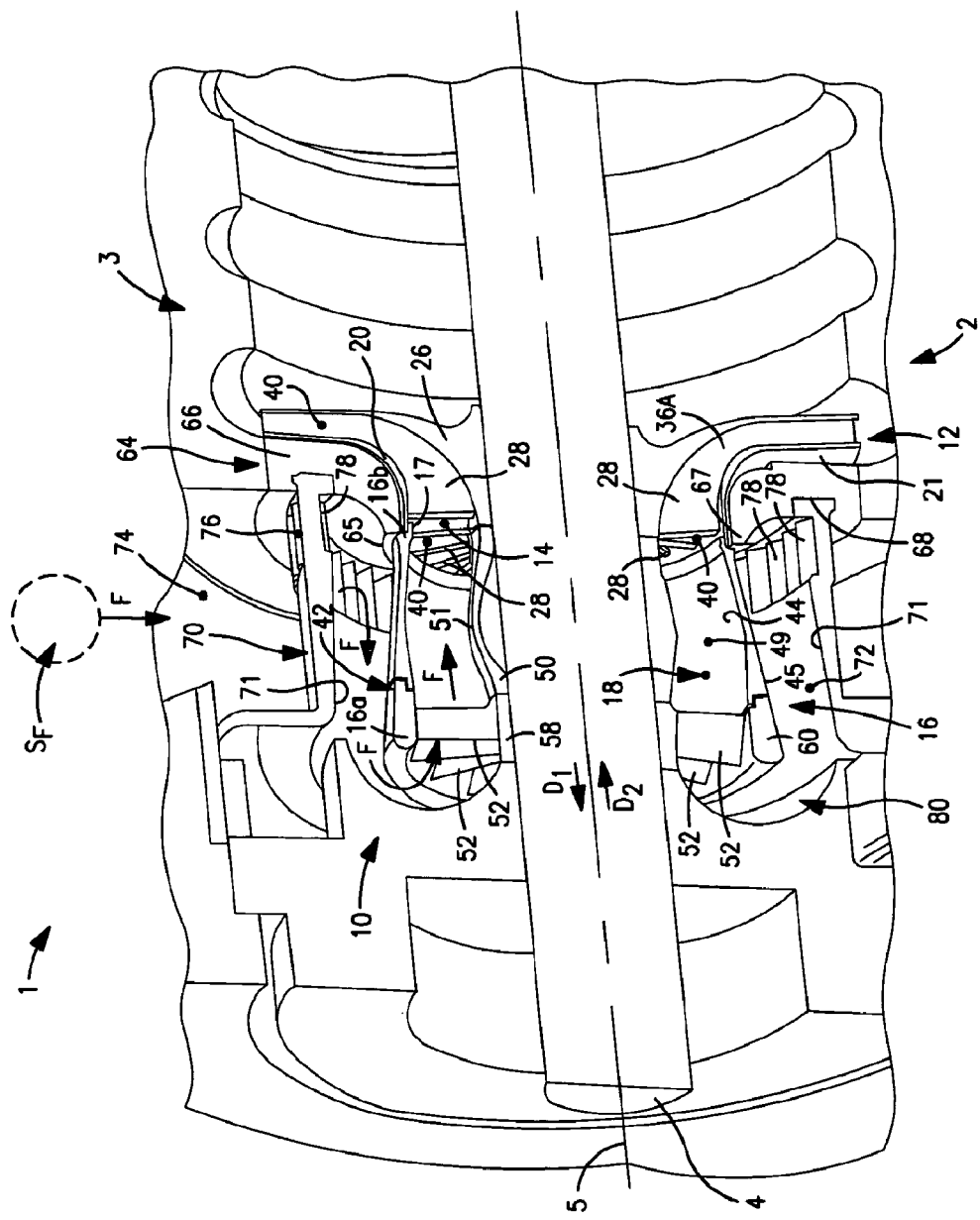
FIG. 1 is a broken away, perspective view of a combination separator and compressor device having a fluid handling assembly in accordance with the present invention.

Certain terminology is used in the following description for convenience only and is not limiting. The words "right", "left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Figure 2:
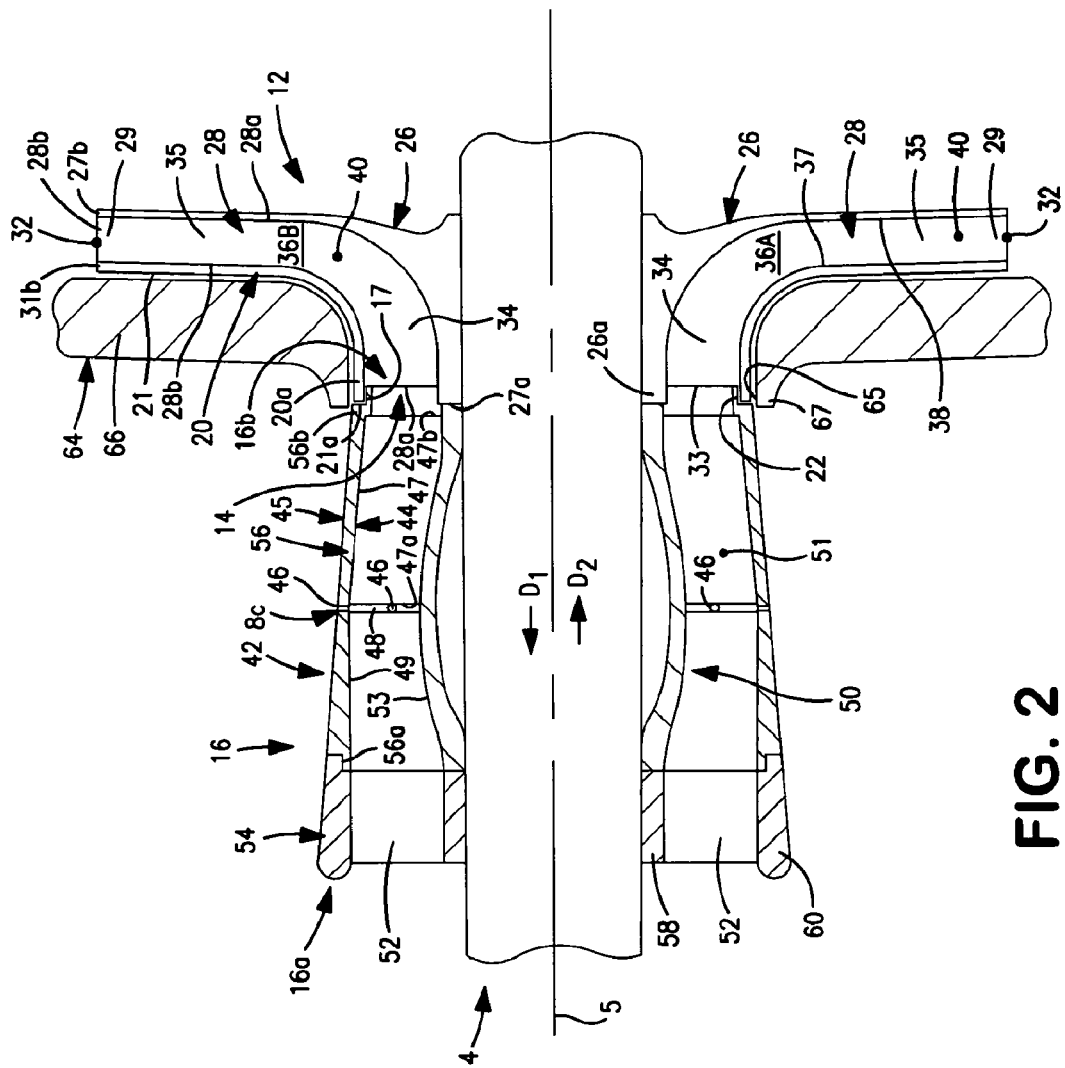
FIG. 2 is an enlarged, broken-away axial cross-sectional view of the fluid handling assembly.
Figure 3:
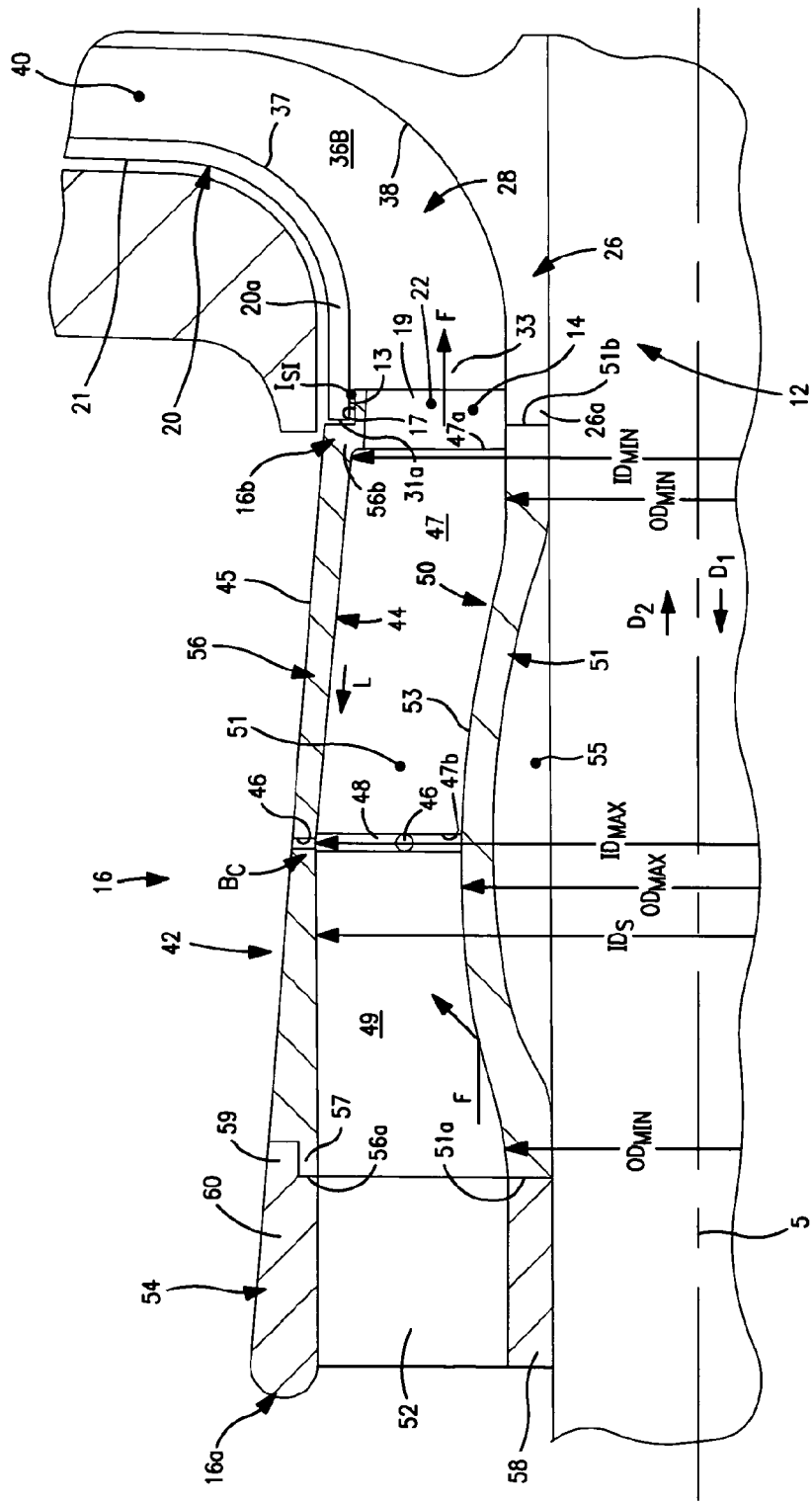
FIG. 3 is a more enlarged, broken-away axial cross-sectional view of the fluid handling assembly.

Referring now to the drawings in detail, wherein like numbers are used to indicate like elements throughout, there is shown in FIGS. 1-3 a fluid handling assembly 10 for a fluid machine 1. The machine 1 is preferably a compressor 2 including a casing 3 and a shaft 4 disposed within the casing 3 and rotatable about a central axis 5. The fluid handling assembly 10 basically comprises an impeller 12 mounted on the shaft 4 and having a central inlet 14 and a rotary separator 16 disposed about the shaft 4. The separator 16 has axially spaced inlet and outlet ends 16a, 16b, respectively, and an interior separation chamber 18 extending generally axially between the two ends 16a, 16b. The separator 16 is coupled with the impeller 12 such that the separator 16 and impeller 12 generally rotate as a single unit about the shaft axis 5 and the separation chamber 18 is fluidly connected with the impeller inlet 14. As such, fluid flowing through the separation chamber 18 passes through the separator outlet end 16b and directly into the impeller inlet 14. Further, the separator 16 is fluidly connectable with a source $S_F$ (FIG. 1) of fluid such that fluid enters the separator inlet end 16a, the separator 16 being configured to remove at least a portion of liquid from fluid flowing through the separation chamber 18 from the inlet end 16a and to discharge the fluid through the outlet end 16 and into the impeller inlet 18.

Preferably, the impeller 12 has an end contact surface 15 located proximal to the inlet 14 and extending circumferentially about the axis 15 and the separator 16 has an end contact surface 17 located proximal to the outlet end 16b and extending circumferentially about the axis 15. The separator contact surface 17 is disposed against the impeller contact surface 13 so as to define an interface $I_{SI}$, the separator outlet end 16b being sealingly coupled with the impeller 12 so as to prevent fluid flow through the interface $I_{SI}$. Thereby, separated or "dried" gas is prevented from flowing outwardly through the interface $I_{SI}$ instead of into the impeller inlet 14, but more importantly, separated liquid externally of the separator 16 is prevented from entering the impeller inlet 14 through the interface $I_{SI}$.

More specifically, the impeller 12 preferably includes a shroud 20 having a generally radially-extending outer surface 21 and central opening 22, which is preferably at least partially defined by the impeller contact surface 13, the central opening 22 at least partially defining the impeller inlet 14, as described above and in further detail below. The separator outlet end 16b is either disposed against the shroud outer surface 21, so as to extend generally about the inlet opening 14, or is preferably partially disposed within the shroud central opening 22. Most preferably, the separator outlet end 16b has an inwardly stepped or offset lip 19 extending axially toward the impeller 12 and circumferentially about the axis 5. The lip 19 at least partially provides the separator contact surface 17 and is sized to fit within the inlet opening 14 of the impeller 12 such that the separator contact surface 17 is disposed within and against the impeller contact surface 13. With this arrangement, radially-outward expansion of the separator 16 during rotation thereof causes the lip 19 to seal against the inner surface 13 of the impeller 12, to thereby substantially prevent flow through the interface $I_{SI}$. However, the separator 16 may be connected with the impeller 12 in any other appropriate manner (e.g., by radial flanges on the separator 16 and/or impeller 12) or may even be integrally connected or formed with the impeller 12, as discussed below.

Referring particularly to FIG. 2, the impeller 12 is preferably generally similar to a conventional centrifugal compressor impeller and includes a hub 26 mounted on the shaft 4, a plurality of vanes 28 spaced circumferentially about the axis 5, and the shroud 20 as discussed above. Each vane 28 has a first side edge 28a connected with the hub 26 and an opposing second side edge 28b, the shroud 20 being connected with the second edges 28b of all of the vanes 28 so as to be spaced axially from the hub 26 and spaced radially outwardly from the shaft 4. The central opening 22 is spaced radially outwardly from the shaft 4 so as to define the impeller inlet opening 14, which is thus preferably generally annular. Further, the hub 26 and the shroud 20 each has inner and outer edges 27a, 27b and 31a, 31b, respectively extending circumferentially about the central axis 5 and each vane 28 has inner and outer ends 28a, 28b, respectively. Each vane inner end 28a is located generally proximal to the inner edges 27a, 31a of the hub 26 and the shroud 20, and each vane outer end 28b is located generally proximal to the outer edges 27, 31b of the hub 26 and the shroud 20. Furthermore, each vane 28 is preferably formed so as to have a generally axial inner portion 34 extending from the first end 28a and a generally radial outer portion 35 extending from the axial portion 34 to the outer end 28b, and has opposing side surfaces 36A, 36B extending between the two ends 28a, 28b and along the inner and outer blade portions 34, 35.

With this structure, the impeller 12 further has a plurality of flow channels 40, each flow channel 40 being defined between a separate one of a plurality of pairs of the vanes 28 and extending between the blade inner and outer ends 28a, 28b. Each flow channel 40 has an inlet end 33 fluidly coupled with the impeller inlet 14 and an outlet 32 defined generally between the hub and shroud outer circumferential edges 27b, 31b. As such, fluid entering the impeller inlet 14 flows through the inlet(s) 33 of at least one and preferably a plurality of the flow channels 40, and thereafter radially outwardly through one or more outlets 32 and generally beyond the hub and shroud outer edges 27b, 31b.

As mentioned above, the impeller 12 is at least generally similar to conventional centrifugal impellers, but preferably modified as follows. The hub 26 and the shroud 20 preferably each have an inlet end 26a, 20a, respectively, that has a greater axial length in comparison with conventional impellers, so as to extend through a static inlet member 64, as described below, and the blade inner ends 33 are also correspondingly axially lengthened. However, the impeller 12 may alternatively be constructed substantially identically to a conventional compressor impeller, with the inlet member 64 and/or separator 16 being appropriately modified to enable connection of the separator 16 with the impeller 12.

Referring to FIGS. 1 and 2, the separator 16 preferably includes a generally tubular body 42 having inner and outer circumferential surfaces 44, 45, the inner surface 44 defining the separator chamber 18 and being configured to separate liquid from a mixed fluid flow F contacting the surface 44 during rotation of the separator 16. As best shown in FIG. 3, the tubular body 42 includes at least one and preferably a plurality of discharge openings 46 extending generally radially between the inner and outer surfaces 44, 45 and spaced circumferentially about the axis 5. The discharge openings 46 are configured to provide a liquid discharge or outlet passage for channeling liquids out of the separator interior chamber 18. Further, the tubular body 42 preferably also includes a generally annular groove 48 extending radially outwardly from the inner surface 44, with the plurality of the discharge openings 46 preferably extending radially between the groove 48 and the outer surface 45. The annular groove 48 provides a collection trough for liquids on the separator inner surface 44, such liquid subsequently flowing out of the separator 16 through the discharge openings 46, as discussed in greater detail below.

Referring to FIGS. 2 and 3, the separator body inner surface 44 includes a generally frustaconical section 47 having a first, radially-smaller circumferential edge 47a located at least generally proximal to the separator outlet end 16b and a second, radially-larger circumferential edge 47b spaced axially from the first edge 47a. The frustaconical surface section 47 faces generally away from the outlet end 16b so as to be configured to direct liquid L contacting the surface section 47 generally radially outwardly and away from the separator outlet end 16b during rotation of the separator 16, as indicated in FIG. 3. Further, the frustaconical surface section 47 has an inside diameter that varies generally constantly along the central axis 5 from a minimum value $ID_{MIN}$ at the surface section first edge 47a and a maximum value $ID_{MAX}$ at the surface section second edge 47b, such that the surface section 47 tapers outwardly or generally widens in a direction $D_1$ from the outlet end 16b inwardly toward the inlet end 16a. Preferably, the second or inner edge 47b of the tubular body frustaconical surface section 47 is located at a central "transition" position or point $B_C$ along the central axis 5 that is disposed generally between the body inlet and outlet ends 16a, 16b, with the groove 48 being located adjacent to the surface second, inner end 47b. However, the surface section 47 may alternatively extend substantially entirely through the body 42, such that the surface section second end 47b is located at the separator inlet end 16a.

Furthermore, the body inner surface 44 preferably further has a generally cylindrical, constant diameter section 49 extending between the central position $B_c$ and the inlet end 16a, the cylindrical surface section 49 having an inside diameter $ID_S$ that is at least generally constant (i.e., equal to the maximum value $ID_{MAX}$), as indicated in FIG. 3. Thus, the body inner surface 44 preferably formed having both the frustaconical, tapering diameter section 47 and the cylindrical, constant diameter section 49. With this surface structure, liquid contacting the tapering section 47 of the inner surface 44 during rotation of the separator 16 is directed or "forced" to flow generally toward the body central position $B_C$, and then flows into the groove 48 and out of the separator 16, as described above.

Referring again to FIGS. 1-3, the separator 16 also preferably includes a generally tubular inner deflector member 50 mounted on the shaft 4 and disposed within the separation chamber 18. The deflector member 50 has a radially outwardly curved outer circumferential surface 53 spaced radially inwardly from the tubular body inner surface 44, such that a generally annular flow channel 49 through the rotary separator 16 is defined between the facing surfaces 44, 53. The deflector member 50 is configured to direct liquids contacting the curved outer surface 53 generally toward the separator body inner surface 44 (as indicated in FIG. 3) for subsequent removal from the separator 16 as described above. More specifically, the deflector member 50 includes a generally tubular body 51 having opposing ends 51a, 51b and a through bore 55 extending between the ends 51a, 51b, the bore 55 being sized to receive a portion of the shaft 4. Further, the deflector tubular body 51 has an enlarged central portion 51c, such that the body outer surface 53 has an outside diameter that varies between about a minimum value $OD_{MIN}$ proximal to each body end 51, 51b to a maximum value $OD_{MAX}$ within the body central portion 51c. As such, liquids contacting the deflector body 50 at directed generally radially outwardly toward the separator body inner surface 44 by the curve shape of the deflector outer surface 53.

Referring again to FIGS. 1-3, the separator 16 preferably includes a plurality of generally radially extending flow blades 52 disposed proximal to the inlet end 16a and spaced circumferentially about the axis 5. The blades 52 also extend generally parallel with the shaft axis 5 and are configured to accelerate fluid flowing into the separator inlet end 16a. More specifically, energy of the rotating shaft 4 is transferred to fluid flowing into the inlet end 16a when the fluid contacts the rotating flow blades 52, such that the blades 52 transmit momentum to the fluid. This transferred energy/momentum causes the fluid to accelerate to the speed of the rotating shaft 4, which increases the efficiency of the compression process when the separated fluid flows into the impeller 12. As such, the downstream inducer portion of a conventional impeller inlet may be eliminated.

Preferably, the separator body 42 includes an inlet member 54 providing the inlet end 16a and the preferred flow blades 52 and a generally tubular drum member 56 connected with the inlet member 54 and the impeller 12 and providing the outlet end 16b. The inlet member 54 includes an annular hub 58 mounted on the shaft 4 and a generally annular outer wall 60 spaced radially outwardly from the hub 58, the plurality of blades 52 extending radially between the hub 58 and the annular wall 60. Further, the tubular drum member 56 has a first end 56a connected with the inlet member 54, a second end 56b spaced axially from the first end 56a (which provides the separator outlet end 16b) and an connected with the impeller 12, and an inner surface providing surface a substantial portion of the separator inner surface 44, as described above. The drum member 56 includes the inwardly offset circumferential lip 19 at the second end 56b and preferably also includes a generally axially extending circumferential tongue 57 engageable with a mating, overlapping tongue 59 of the inlet member 54. As such, the drum 56 is preferably "sandwiched" between the inlet member 54 and the impeller shroud 20 so as to be axially retained thereby. Further, the inner deflector member 50 is preferably sandwiched between the inlet member hub 58 and the impeller hub 26, and thus axially retained.

Although the two-piece structure 54, 56 as described above is presently preferred, the separator 16 may alternatively be formed of a single generally tubular body or of three of more connected together members/pieces (neither shown). Further, as mentioned above, the rotary separator 16 may alternatively be integrally formed with the impeller 12 as opposed to being fixedly or removably connected. The scope of the present invention includes these and all other appropriate constructions of the separator 16 and/or the impeller 12 which function generally as described herein.

Referring to FIGS. 1 and 2, the fluid machine 1 or compressor 2 also preferably includes a static compressor inlet member 64 having a central opening 65 configured to receive at least a portion of the impeller 12 with clearance, so as to preferably avoid contact between the inlet member 64 and the impeller 12. The static member 64 is configured to partially bound the compressor first or inlet stage, and is fixedly supported by the casing 3. Further, the static member 64 preferably includes a generally disk-like circular body 66 with a generally axially-extending, circular ridge 67 extending about the central opening 65, which generally overlaps the interface $I_{SI}$ of the separator 16 and the impeller 12, and a generally circular groove 68 (FIG. 1) spaced radially outwardly from the ridge 67 and extending circumferentially about the axis 5. The static member groove 68 is configured to receive an end portion of a static separator member 70, as discussed below.

Referring particularly to FIG. 1, the preferred compressor 2 is preferably a "multistage" compressor that further includes at least one and preferably two or more other impellers (none shown) spaced axially from the "first stage" impeller 12, such that the first stage impeller 12 is disposed generally axially between the separator 16 and the other or "latter stage" impeller(s). The plurality of outlets 32 of the first stage impeller 12 are fluidly coupled with an inlet (not shown) of an adjacent impeller, and each latter stage impeller is at least generally similarly constructed as the inlet impeller 12. However, the combination separator compressor device 2 may alternatively include only the single impeller 12.

Preferably, the compressor 2 further comprises a static separator 70 disposed about the rotary separator 16 and having an inner circumferential separation surface 71 spaced radially outwardly from the separator so as to define a generally annular flow passage 72 fluidly coupled with the rotary separator inlet end 16a. The static separator 70 is preferably constructed such that fluid F flows through the annular flow passage 72 in a first axial direction $D_1$, with the static member separation surface 71 being configured to remove liquid from fluid contacting the surface 71. Further, a generally annular casing inlet passage 74 is fluidly connected with the separator passage 72, preferably through a radial port 76. A plurality of fluid vanes 78 are preferably disposed within the radial port 76 and are configured to initiate swirling motion within the separator passage 72, such that the liquid flow is directed generally onto an inner surface 71 of the static separator 70. Furthermore, the static separator 70 also preferably includes a generally radially-extending wall 80 spaced axially from the separator inlet end 16a, the radial wall 80 being configured to direct fluid F exiting the annular flow passage 72 to flow generally in a second, opposing direction $D_2$ into the separator inlet end 16a.

With the above structure, a fluid stream F first flows generally radially through the vanes 78 and is deflected to flow generally axially about in the first direction $D_1$ within the annular inlet passage 74, such that at least larger fluid particles are preferably separated by contact with the static separator inner surface 71. Next, the fluid is directed to flow radially about the rotatable separator inlet end 16a and then axially in the opposing direction $D_2$ into the flow blades 52, such that the fluid stream is accelerated by contact with the blades 52. Portions of flow proximal to the shaft 4 contact the rotatable deflector 50 and are directed toward the separator inner surface 44, whereas other stream portions flow directly into contact with the separator surface 44. Due to such contact with the rotating, angled surface 44, liquid in the fluid stream F first adheres to the surface 44, flows generally in the first axial direction $D_1$ to the collection groove 48, and thereafter out of the separator 16 through the discharge openings 46. The substantially gaseous portions of the fluid stream F then flows out of the separator chamber 18 and directly into the impeller inlet 14. Any remaining small liquid droplets or mist in the gas flow stream are centrifuged out to the separator surface 44 by the swirling motion of the gas relative to the central rotational axis 5.

The fluid handling assembly 10 of the present invention provides a number of benefits over previously known separator-compressor assemblies/devices. By eliminating the static swirl and de-swirl vanes at the separator inlet and outlet, respectively, the assembly 10 reduces the total axial space (i.e., along the shaft 4) required for the various components of the combination separator and compressor device 2. Also, by connecting the rotary separator 16 with the impeller 12, such that both components 12, 16 rotate generally as a single unit, the need to seal the outlet end 16b of the rotary separator 16 against a static component of the fluid machine 1 is eliminated. Thereby, a potential flow path for the reintroduction of liquid into the separated gas stream F is also eliminated. Further, as discussed above, due to the fact that the fluid stream F flowing through the separator 16 is not swirled at the separator inlet 16a and then de-swirled prior to entry into the impeller 12, energy losses are reduced and compressor efficiency is increased.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A fluid handling assembly for a fluid machine, comprising:
    an impeller mounted on a shaft and having an impeller inlet; and
    a rotary separator mounted on the shaft and having a separator inlet end, a separator outlet end axially spaced apart from the separator inlet end, and an interior separation chamber, wherein the rotary separator is coupled with the impeller such that a fluid within the interior separation chamber flows from the separator outlet end directly into the impeller inlet.

2. The fluid handling assembly of claim 1, wherein the rotary separator and the impeller rotate as a single unit about a central axis of the fluid machine.

3. The fluid handling assembly of claim 1, wherein the rotary separator is configured to remove at least a portion of a liquid from the fluid flowing through the separator inlet end, the interior separation chamber, and the separator outlet end, and into the impeller inlet.

4. The fluid handling assembly of claim 1, wherein:
    the impeller has an impeller end surface located proximal to the impeller inlet and extending circumferentially about a central axis of the fluid machine; and
    the rotary separator has a separator end surface located proximal to the separator outlet end, extending circumferentially about the central axis, disposed against the impeller end surface so as to define an interface, wherein the rotary separator is sealingly coupled with the impeller at the interface.

5. The fluid handling assembly of claim 1, wherein:
    the impeller includes a shroud having a radially-extending shroud outer surface and a shroud central opening that at least partially defines the impeller inlet; and
    the separator outlet end is disposed against the radially-extending shroud outer surface, or at least partially disposed within the shroud central opening.

6. The fluid handling assembly of claim 5, wherein the rotary separator further comprises:
    a tubular body having a tubular body inner surface; and
    an annular ledge spaced radially inward from the tubular body, disposed within the shroud central opening, extending axially from the tubular body, and defining the separator outlet end.

7. The fluid handling assembly of claim 6, wherein:
    the shroud has a shroud edge surface defining the shroud central opening;
    the tubular body has a tubular body outer surface;
    the annular ledge has an outer circumferential surface spaced radially inward from the tubular body outer surface, such that a radial shoulder surface extends between the tubular body outer surface and the outer circumferential surface; and
    the shroud edge surface is disposed against the radial shoulder surface.

8. The fluid handling assembly of claim 1, wherein the impeller further comprises:
    a hub mounted on the shaft;
    a plurality of vanes each having a first side edge connected with the hub and a second side edge that opposes the first side edge, wherein the plurality of vanes are spaced circumferentially apart around a central axis of the fluid machine; and a shroud connected to the second side edge of each of the plurality of vanes, spaced axially from the hub and radially outward from the shaft, the shroud having a shroud central opening spaced radially outward from the shaft so as to define the impeller inlet, wherein the separator outlet end is connected with the shroud such that the interior separation chamber is fluidly coupled with the shroud central opening.

9. The fluid handling assembly of claim 8, wherein:
the hub and the shroud each have inner and outer edges extending circumferentially about the central axis;
each of the plurality of vanes has an inner end located proximal to the inner edge of the hub and the inner edge of the shroud, and an outer end located proximal to the outer edge of the hub and the outer edge of the shroud; and
the impeller further comprises a plurality of flow channels each defined between the plurality of vanes and extending between the inner and outer ends of each of the plurality of vanes such that the fluid entering the impeller inlet flows through at least one of the plurality of flow channels and radially outward beyond the outer edge of the hub and the outer edge of the shroud.

10. The fluid handling assembly of claim 1, wherein the rotary separator further comprises a separator tubular body having inner circumferential surface at least partially defining the interior separation chamber, and an outer circumferential surface, wherein the inner circumferential surface is configured to separate a liquid from the fluid contacting the inner circumferential surface during rotation of the rotary separator.

11. The fluid handling assembly of claim 10, wherein the rotary separator further comprises a deflector member mounted to the shaft and having an outer surface spaced radially inward from the inner circumferential surface of the separator tubular body, wherein the deflector member is configured to direct liquids contacting the outer surface toward the inner circumferential surface.

12. The fluid handling assembly of claim 11, wherein:
the deflector member further comprises a deflector tubular body having opposing ends, a body outer surface, a through bore extending between the opposing ends and sized to receive a portion of the shaft, and an enlarged central portion; and
the body outer surface has an outside diameter that varies between a minimum value proximal to each of the opposing ends and a maximum value at the enlarged central portion.

13. The fluid handling assembly of claim 10, wherein the separator tubular body includes at least one opening extending radially between the inner and outer circumferential surfaces and providing a liquid outlet passage for directing the liquid out of the interior separation chamber.

14. The fluid handling assembly of claim 13, wherein the separator tubular body further comprises:
an annular groove extending radially inward from the inner circumferential surface; and
a plurality of openings extending radially between the annular groove and the outer circumferential surface and spaced circumferentially apart around a central axis of the fluid machine.

15. The fluid handling assembly of claim 10, wherein the inner circumferential surface of the separator tubular body further comprises a frustoconical section facing away from the separator outlet end and having a first circumferential edge located proximal to the separator outlet end and a second circumferential edge that is radially larger than the first circumferential edge and is spaced axially from the first circumferential edge, wherein the frustoconical section is configured to direct fluid contacting the frustoconical section radially outward and away from the separator outlet end during rotation of the rotary separator.

16. The fluid handling assembly of claim 1, wherein the rotary separator further comprises a plurality of blades disposed proximal to the separator inlet end and spaced circumferentially about a central axis of the fluid machine, wherein the plurality of blades are configured to accelerate the fluid flowing into the separator inlet end during rotation of the rotary separator.

17. The fluid handling assembly of claim 1, wherein the rotary separator further comprises:
an inlet member providing the separator inlet end and including an annular hub mounted on the shaft, an annular outer wall spaced radially outward from the annular hub, and a plurality of blades extending radially between the annular hub and the annular outer wall; and
a tubular drum member having a first end connected to the inlet member, a second end spaced axially from the first end, providing the separator outlet, and connected with the impeller, and an inner circumferential surface defining the interior separation chamber and fluidly connected to the impeller inlet.

18. The fluid handling assembly of claim 1, further comprising a static separator disposed about the rotary separator and having a static separator inner circumferential surface spaced radially outward from the rotary separator so as to define an annular flow passage that is fluidly coupled with the separator inlet end.

19. The fluid handling assembly of claim 18, wherein the static separator further comprises a radially extending wall spaced axially apart from the separator inlet end, wherein the fluid flows through the annular flow passage in a first axial direction, and the radially extending wall is configured to direct fluid exiting the annular flow passage to flow in a second, opposing direction into the separator inlet end.

20. A fluid handling assembly, comprising:
an impeller mounted on a shaft and having an impeller inlet and an impeller outlet;
a rotary separator mounted on the shaft and having a separator inlet end, a separator outlet end that is axially spaced apart from the separator inlet end and is attached to the impeller inlet, and an interior separation chamber extending between the separator inlet end and the separator outlet end, wherein the rotary separator and the impeller rotate on the shaft as a single unit; and
a static separator defined around the rotary separator, fluidly connected with the separator inlet end, and having a static separator inner circumferential surface spaced radially apart from the rotary separator defining an annular passage therebetween, and an annular wall disposed at an axial end of the static separator such that a fluid traveling through the static separator proceeds through the static separator in a first axial direction and is turned by the annular wall to travel through the rotary separator in a second axial direction that opposes the first axial direction.

* * * * *